(12) United States Patent
Rutan (10) Patent No.: US 7,195,207 B2
(45) Date of Patent: Mar. 27, 2007

(54) WINGED SPACECRAFT

(75) Inventor: Elbert L. Rutan, Mojave, CA (US)

(73) Assignee: Mojave Aerospace Ventures, LLC, Seattle, WA (US)

( * ) Notice: Subject to any disclaimer, the term of this patent is extended or adjusted under 35 U.S.C. 154(b) by 7 days.

(21) Appl. No.: 10/515,777

(22) PCT Filed: Mar. 29, 2004

(86) PCT No.: PCT/US2004/009695

§ 371 (c)(1),
(2), (4) Date: Nov. 1, 2005

(87) PCT Pub. No.: WO2004/092013

PCT Pub. Date: Oct. 28, 2004

(65) Prior Publication Data

US 2006/0108479 A1    May 25, 2006

Related U.S. Application Data (60) Provisional application No. 60/458,697, filed on Mar. 28, 2003.

(51) Int. Cl.
*B64G 1/14* (2006.01)

(52) U.S. Cl. ................................. 244/159.1

(58) Field of Classification Search ............. 244/158.1, 244/158.7, 158.9, 159.1, 159.3, 171.7, 172.6
See application file for complete search history.

(56) References Cited

U.S. PATENT DOCUMENTS

| | | |
|---|---|---|
| 3,065,937 A | 11/1962 | Vigil |
| 3,125,313 A | 3/1964 | Soderberg |
| 3,160,366 A | 12/1964 | Graffenried |
| 3,204,892 A | 9/1965 | Powell |
| RE26,380 E | 4/1968 | Rogallo |
| 3,390,853 A | 7/1968 | Wykes |
| D211,915 S | 8/1968 | Raymes et al. |
| 3,534,924 A | 10/1970 | Spencer, Jr. et al. |
| 4,047,680 A | 9/1977 | Kaniut |

(Continued)

FOREIGN PATENT DOCUMENTS

JP        03167098 A        7/1991

OTHER PUBLICATIONS

Abstract of Japanese Patent No. JP 403167098 A, Published Jul. 18, 1991, Inventor Horikawa, Makoto.

*Primary Examiner*—Timothy D. Collins
(74) *Attorney, Agent, or Firm*—Christie, Parker & Hale, LLP (57) ABSTRACT

A rocket-powered spacecraft having a wing which has hinged aft portions which can be elevated about a hinge line. Tail booms extend rearwardly from the outer ends of the aft wing portions, and rudders are mounted at the aft ends of the booms. Each tail boom supports a horizontal tail with an elevon at its trailing edge. In normal flight, the wing aft portions are not elevated, and the wing has a normal airfoil shape. During atmosphere reentry, the wing aft portions are steeply elevated to provide a stable high-drag altitude for the spaceship for speed reduction at low thermal and structural loading. After reentry, the aft wing is returned to an unelevated position which enables gliding flight to a horizontal-runway landing.

8 Claims, 8 Drawing Sheets

U.S. PATENT DOCUMENTS

| | | |
|---|---|---|
| 4,703,905 A | 11/1987 | Corbett |
| 4,896,847 A | 1/1990 | Gertsch |
| 5,029,773 A | 7/1991 | Lecat |
| 5,169,095 A | 12/1992 | Lecat |
| 6,502,785 B1 | 1/2003 | Teter et al. |

WINGED SPACECRAFT

CROSS-REFERENCE TO RELATED APPLICATIONS

This application is a National Stage application of International PCT Application No. PCT/US2004/009695, filed Mar. 29, 2004, which claims the benefit of the filing date of U.S. Provisional application No. 60/458,697, filed Mar. 28, 2003.

BACKGROUND OF THE INVENTION

Atmospheric reentry of a returning spacecraft is a critical flight phase due to high structural and thermal-heating loads. Horizontal-landing modern spacecraft intended for runway landing require three-axis control and more lift as compared to early blunt-body spacecraft (Mercury, Gemini, etc.), which were lowered by parachute during landing. This invention relates to a winged spacecraft which is reconfigurable during reentry to a stable high-drag mode, and then returned to a regular flight condition for runway landing. The invention is described in terms of a suborbital spaceship, but is applicable to craft capable of orbital flight.

SUMMARY OF THE INVENTION

A spacecraft having a fuselage supporting right and left wings having hinged aft sections with outer ends supporting rearwardly extending tail booms with vertical tails and rudders, and horizontal tails with trailing-edge elevons. An elevating system coupled between the fuselage and aft wing sections enables movement of the aft sections and tail booms between a normal-airfoil shape for space and atmospheric flight, and an elevated high-drag position for stable and controlled atmospheric reentry.

DETAILED DESCRIPTION OF THE INVENTION

Figure 1:
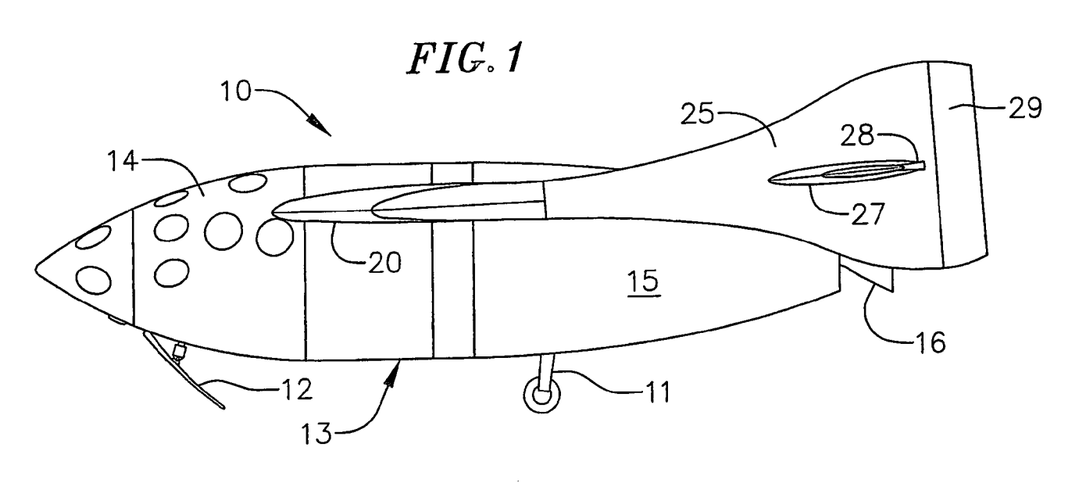
FIG. 1 is a side view of a suborbital spacecraft as configured for landing.
Figure 2:
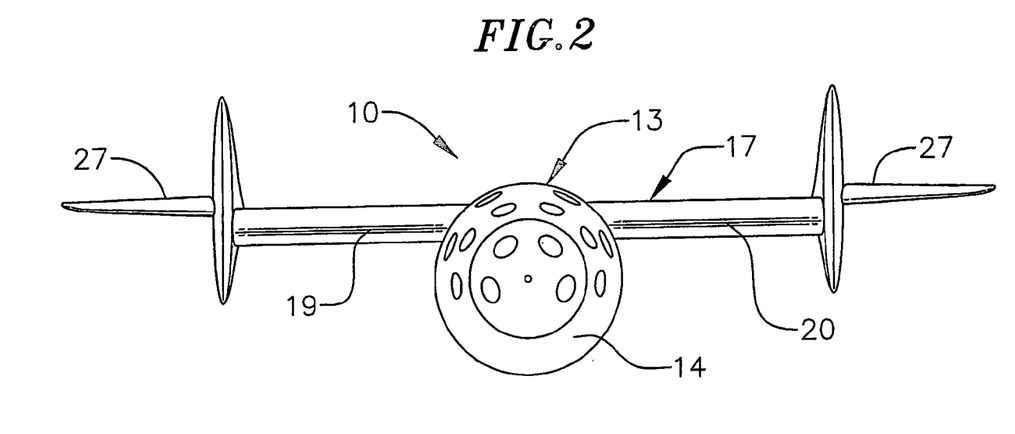
FIG. 2 is a front view of the spacecraft, with the landing gear retracted.
Figure 3:
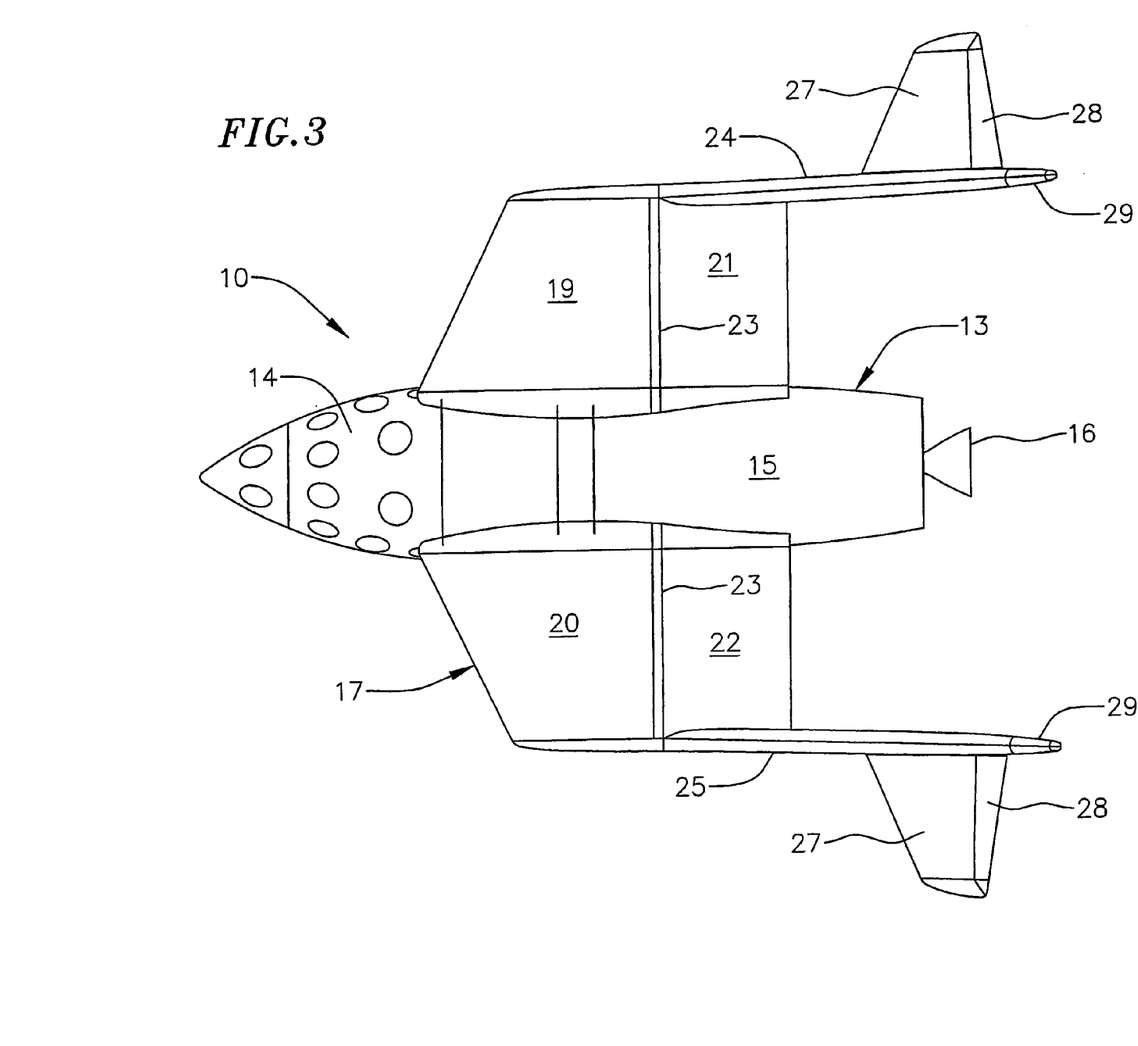
FIG. 3 is a top view of the spacecraft.

FIGS. 1–3 show a suborbital spacecraft 10 as configured for rocket-powered flight into space, for subsonic flight after reentry, and for landing. The spacecraft is shown in FIG. 1 with a rear landing gear 11 and nose skid 12 as extended for landing, but those components are retracted in the other views.

The spacecraft has a fuselage 13 with a pilot compartment 14 at its forward end. An aft fuselage portion 15 houses and mounts a hybrid-fuel rocket engine, a rear nozzle 16 of which is shown in the drawings. A wing 17 has right and left forward sections 19 and 20 fixed to the fuselage, and aft right and left sections 21 and 22 which are coupled together, and upwardly movable about a hinge line 23. Aft sections 21 and 22 are about one-third of the total width or chord of the wing. Rigidly secured to the outer ends of the aft wing sections are rearwardly extending right and left tail booms 24 and 25.

Extending outwardly from, and rigidly secured to the outer sides of each boom are power-actuated stabilators or horizontal tails 27, each of which mount hinged elevons 28 which are independently movable by the pilot for control of the pitch-and-roll axes. Rudders 29 are movably hinged to the rear ends of vertical tails on the tail booms for yaw control. This configuration provides good stability and control in atmospheric flight, and ample lift and glide range is available with three-axis control for flare and landing.

Figure 4:
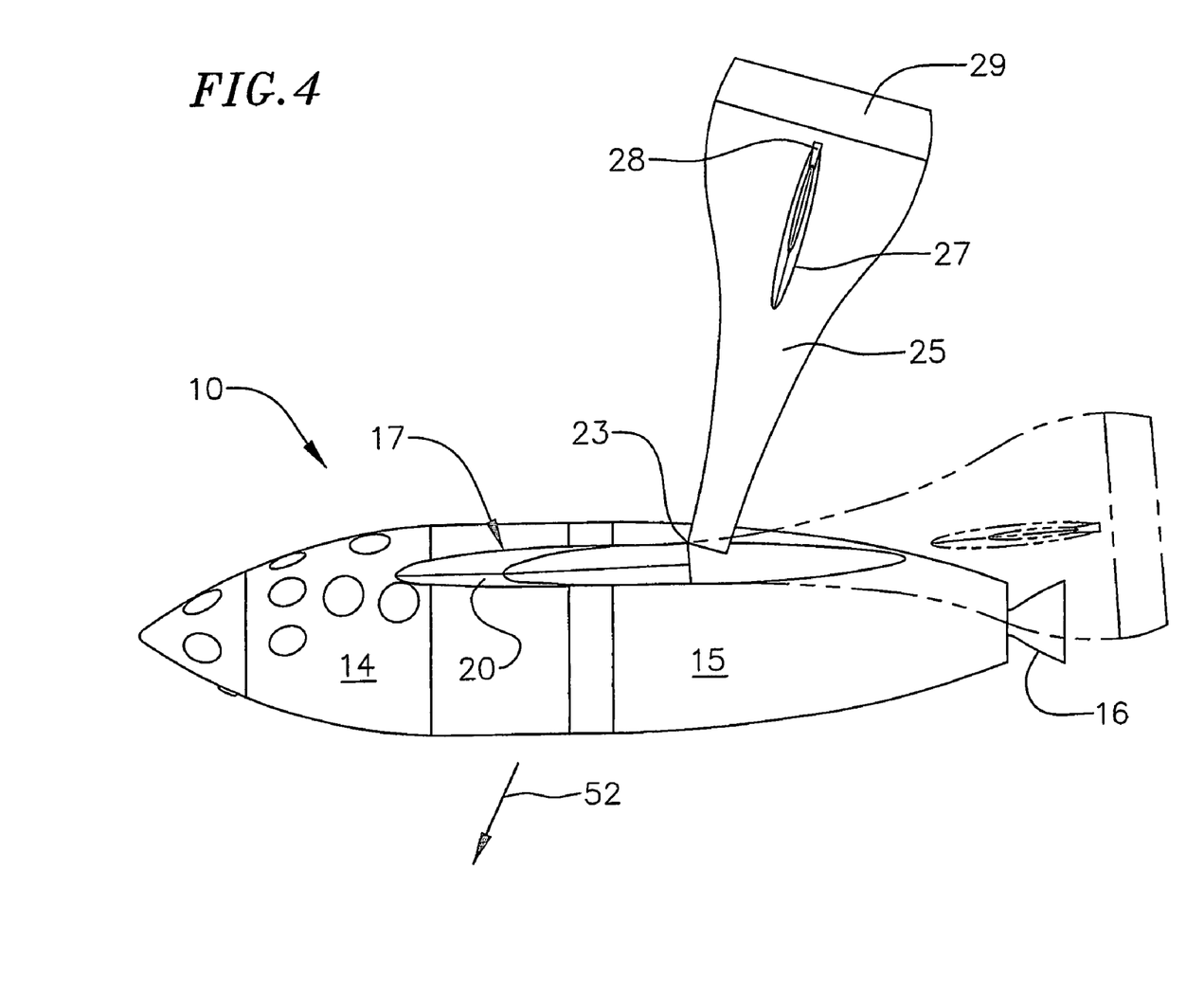
FIG. 4 is a side view of the spacecraft as reconfigured for reentry.
Figure 5:
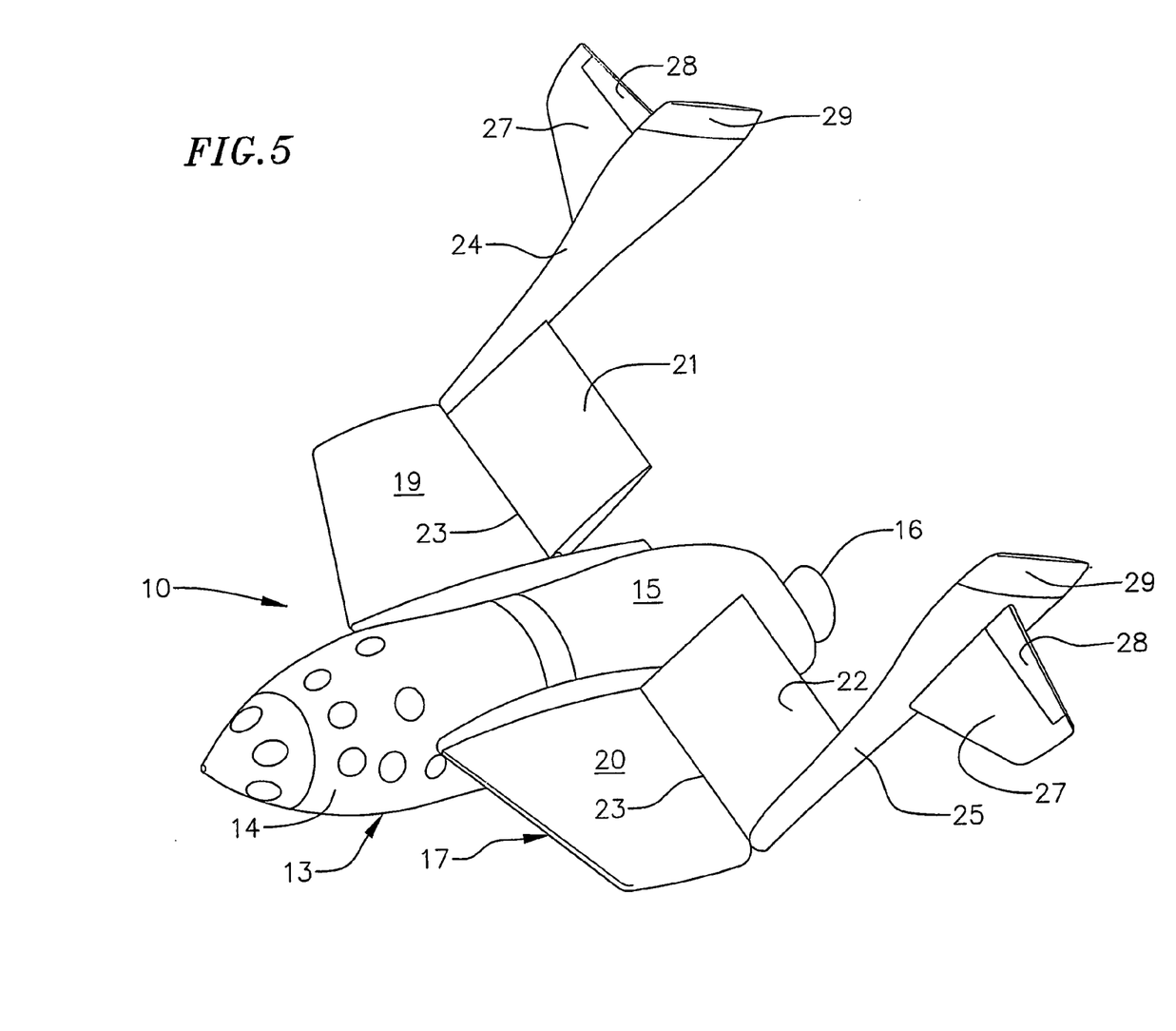
FIG. 5 is a top and front perspective view of the reconfigured spacecraft.
Figure 6:
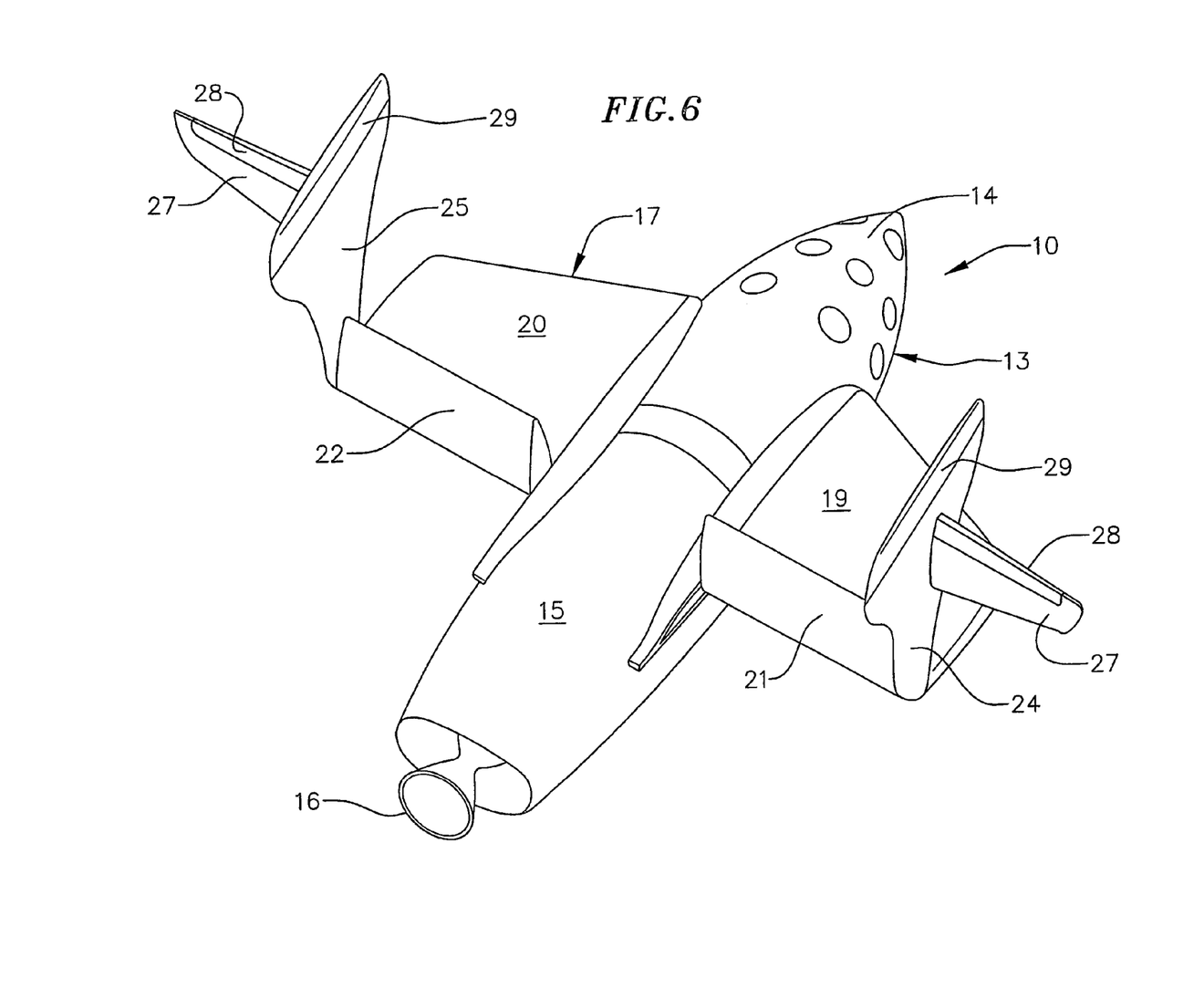
FIG. 6 is a top rear perspective view of the reconfigured spacecraft.

Prior to reentry from space flight, the spacecraft is reconfigured (by actuators described below) to a high-drag shape in which the aft wing sections and tail booms are moved or tilted upwardly about hinge line 23. This high-drag position, as shown in FIGS. 4–6, is called a "feathered" configuration, and the tilt angle is large, and in the range of 65 degrees from the normally configured "unfeathered" wing.

Figure 7:
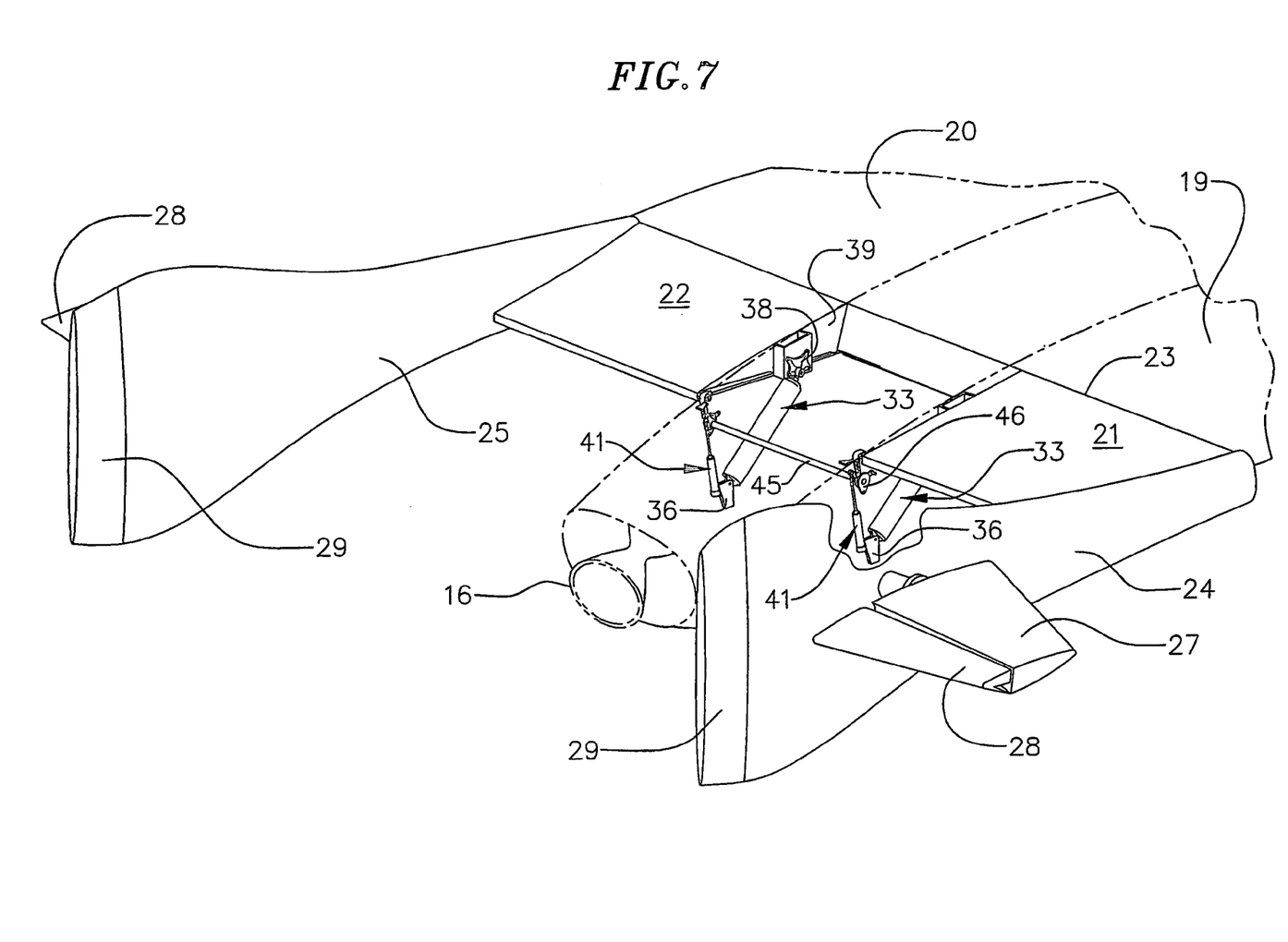
FIG. 7 is a perspective view, partly broken away, of a system of the spacecraft for elevating rear-wing and tail-boom sections.
Figure 8:
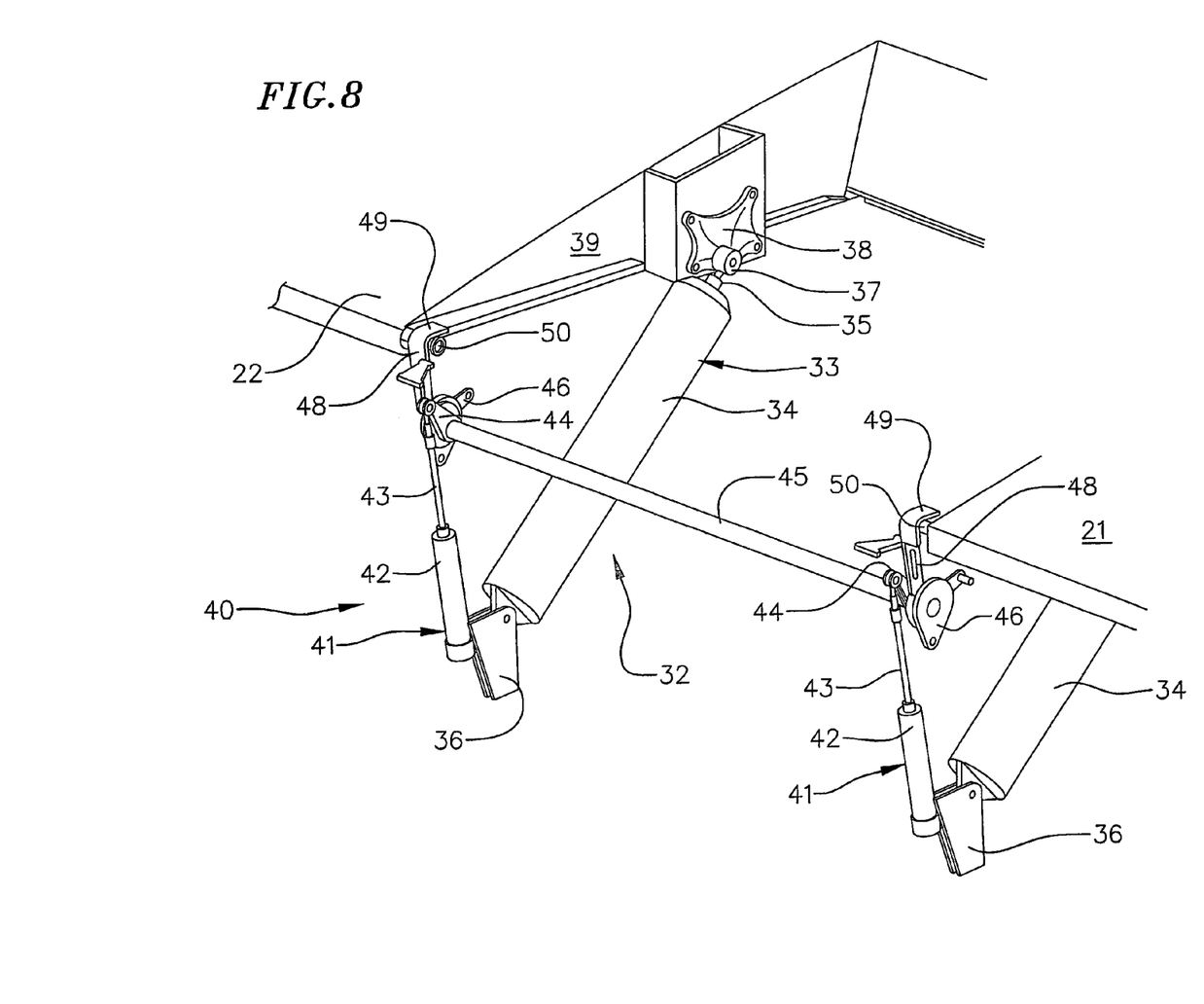
FIG. 8 is a more detailed view of the elevating system.
Figure 9:
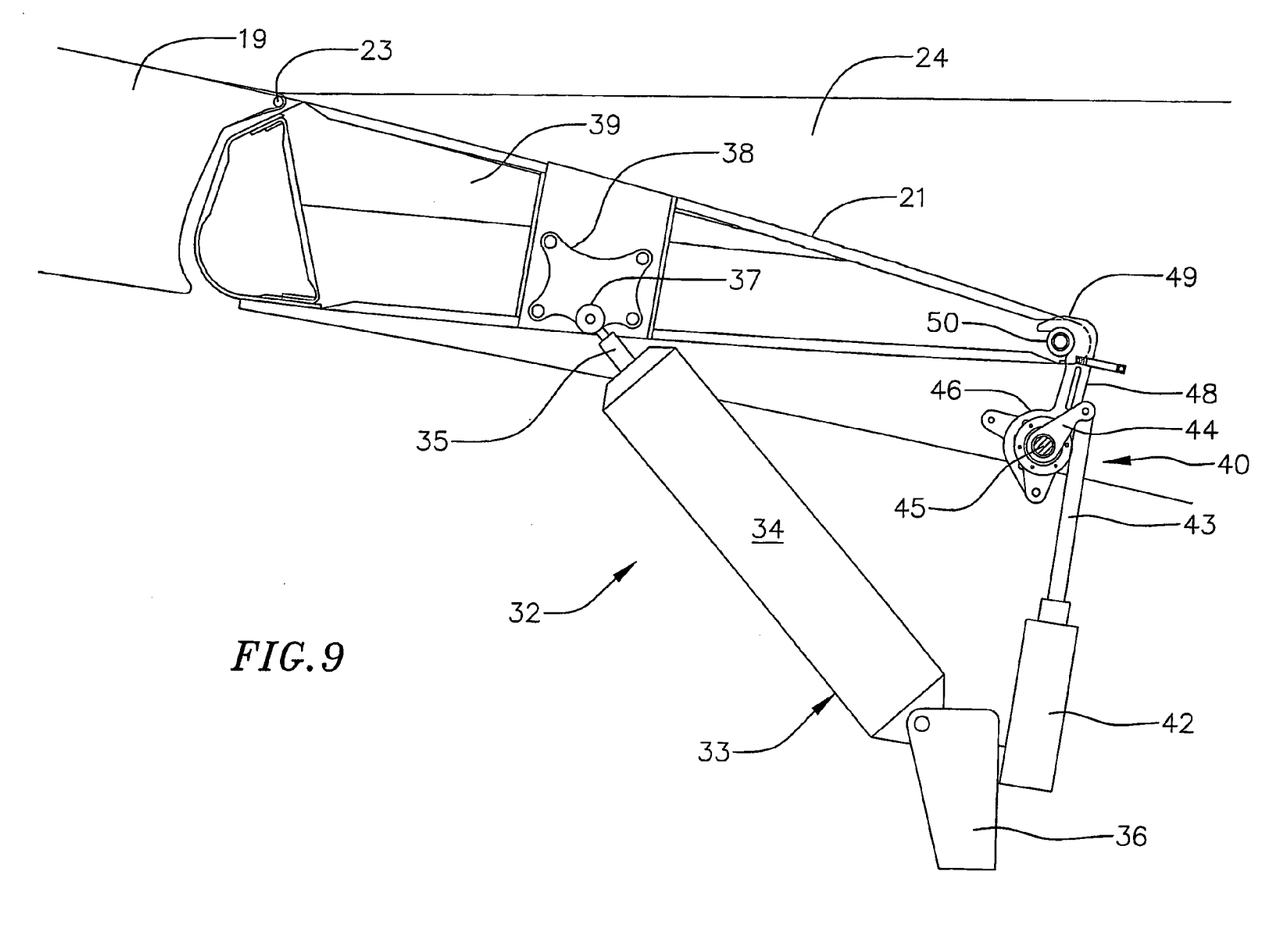
FIG. 9 is a side view of a portion of the elevating system on the right aft wing section.

FIGS. 7–9 illustrate an elevating system 32 for raising and lowering the aft wing sections and tail booms between the feathered and unfeathered conditions. The system includes two pneumatic actuators 33 with cylinders 34 and movable pistons 35. A lower end of each cylinder is pivotably secured to a bracket 36 which is rigidly secured to the spacecraft fuselage. Ends 37 of pistons 35 are pivotally secured to brackets 38 rigidly mounted on the inner faces 39 of the aft wing sections. The actuators are driven by a pressurized air cylinder (not shown) mounted in the spacecraft.

Pilot-controlled pressurization of actuators 33 drive the aft wing sections and tail booms upwardly and downwardly. To prevent inadvertent movement of these rear parts of the spacecraft, and to unload actuators 33 during unfeathered flight, a lock system 40 is provided. System 40 has a pair of right and left pneumatic actuators 41 with cylinders 42 having lower ends pivotally secured to brackets 36. Extending from cylinders 42 are pistons 43 with ends pivotally connected to aft-extending links 44 connected by a rigid crossbar 45. The crossbar is in turn rotatably supported by right and left brackets 46 secured to the spacecraft fuselage. Outboard of each link 44 are upwardly extending lock members 48 secured to crossbar 45, and each lock member has a forwardly extending end 49 fitted over a mating pin 50 secured at the inner trailing edge of each aft wing section when the spacecraft is in an unfeathered configuration.

To unlock the aft wing sections, actuators 41 are pressurized to withdraw pistons 43 from an extended position, thereby rotating crossbar 45 to move lock-member ends 49 rearwardly away from pins to unlocked positions. Actuation of cylinders 34 will then drive the aft wing sections to the elevated feathered position. When the wing sections are retracted after reentry, actuators 41 are again pressurized to extend pistons 43 to reengage the lock system.

During spacecraft reentry of the atmosphere in the feathered configuration, the craft will seek and maintain a shuttlecock-like stable attitude in pitch and roll at all speeds. The angle of attack of the wing is very high in this configuration, and is estimated at about 54 degrees at supersonic speeds in the range of Mach 3, and about 64 degrees at subsonic speeds. This results in the desired high aerodynamic drag, with drag exceeding lift by a factor of about two, and low structural and thermal loads. The spacecraft can also be yawed during reentry to adjust the direction of the lift vector for trajectory correction. Arrow 52 in FIG. 4 is a typical velocity vector of the spacecraft during reentry.

After reentry with the spacecraft slowed to a subsonic speed, the craft is reconfigured to an unfeathered condition with a glide ratio in the range of seven to eight. For example, if the spacecraft is unfeathered at about an 50,000-foot altitude, it can glide a horizontal distance in excess of 50 miles to a desired landing place. With three-axis control restored, the craft is easily turned, and flared for a horizontal-runway landing.

What is claimed is:

1. A spacecraft with a fuselage, right and left wings extending from the fuselage, the wings having hinged aft sections with outer ends supporting rearwardly extending tail booms with vertical and horizontal tails with rudders and elevons, and an elevating system coupled between the fuselage and the aft wing sections for moving the sections from a normal airfoil shape to an elevated position producing high drag for slowing the spacecraft during atmospheric reentry after space flight, the elevating system thereafter retracting the aft wing sections to the normal airfoil shape for a controlled generally horizontal runway landing.

2. The spacecraft defined in claim 1, wherein reentry in the elevated position is stable, and at a steep descent angle with the fuselage generally horizontal.

3. The spacecraft defined in claim 1, wherein the hinged aft wing sections have a width of about one-third of a total width of the wing.

4. The spacecraft defined in claim 1 wherein the aft wing sections are rotated upwardly about 65 degrees in the elevated position.

5. The spacecraft defined in claim 1, wherein the elevating system includes pneumatic actuators.

6. The spacecraft defined in claim 1, and further comprising a pilot-controlled lock system for locking the aft wing sections in the normal airfoil shape, the lock system being disengageable before actuation of the elevating system.

7. The spacecraft defined in claim 6, wherein the lock system includes pneumatic actuators.

8. The spacecraft defined in claim 1, and further comprising means for rigidly connecting together the aft wing sections.

* * * * *